United States Patent
Itsumi et al.

(10) Patent No.: US 12,087,048 B2
(45) Date of Patent: Sep. 10, 2024

(54) VIDEO ANALYSIS METHOD AND SYSTEM, AND INFORMATION PROCESSING DEVICE, TRANSMITS IMAGE FRAME TO CLOUD SERVER BASED ON DIFFERENCE BETWEEN ANALYSIS RESULT ON THE EDGE SIDE AND RESULT PREDICTED ON A CLOUD SERVER

(71) Applicant: NEC Corporation, Tokyo (JP)

(72) Inventors: Hayato Itsumi, Tokyo (JP); Takanori Iwai, Tokyo (JP); Florian Beye, Tokyo (JP); Yusuke Shinohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 17/765,512

(22) PCT Filed: Oct. 7, 2019

(86) PCT No.: PCT/JP2019/039453
§ 371 (c)(1),
(2) Date: Mar. 31, 2022

(87) PCT Pub. No.: WO2021/070215
PCT Pub. Date: Apr. 15, 2021

(65) Prior Publication Data
US 2022/0345590 A1 Oct. 27, 2022

(51) Int. Cl.
*G06V 10/94* (2022.01)
*G06T 7/12* (2017.01)
(Continued)

(52) U.S. Cl.
CPC .............. *G06V 10/95* (2022.01); *G06T 7/12* (2017.01); *G06V 10/776* (2022.01); *G06V 10/82* (2022.01); *G06V 20/49* (2022.01); *G06V 30/1916* (2022.01)

(58) Field of Classification Search
CPC ...... G06V 10/776; G06V 10/82; G06V 10/95; G06V 20/49; G06V 30/1916
See application file for complete search history.

(56) References Cited

U.S. PATENT DOCUMENTS 11,503,101 B1 * 11/2022 Russo ................. H04L 65/612
11,809,297 B2 * 11/2023 Itsumi ................ G06F 11/3051
(Continued)

FOREIGN PATENT DOCUMENTS

CN 113380254 A * 9/2021
CN 117079108 A * 11/2023
(Continued)

OTHER PUBLICATIONS

Grulich, Philipp M., and Faisal Nawab, "Collaborative edge and cloud neural networks for real-time video processing" Proceedings of the VLDB Endowment 11, No. 12: 2046-2049. (Year: 2018).*
(Continued)

*Primary Examiner* — Scott A Rogers
(74) *Attorney, Agent, or Firm* — Sughrue Mion, PLLC

(57) ABSTRACT

According to the present disclosure, a video analysis method and a video analysis system in which video analysis accuracy at a cloud server and an edge is improved is provided. The video analysis method includes a first image analysis step of analyzing an input image frame on the edge side, a difference value estimation step of estimating a difference value between an evaluation value of an analysis result in the first image analysis step and an evaluation value of an analysis result being predicted when the input image frame is analyzed by the cloud server, and a filtering step of determining whether to transmit the input image frame to the cloud server, based on the difference value.

18 Claims, 13 Drawing Sheets

(51) Int. Cl.
*G06V 10/776* (2022.01)
*G06V 10/82* (2022.01)
*G06V 20/40* (2022.01)
*G06V 30/19* (2022.01)

(56) References Cited

U.S. PATENT DOCUMENTS

2014/0313415 A1 10/2014 Yokomitsu et al.
2019/0025801 A1 1/2019 Suzuki et al.

FOREIGN PATENT DOCUMENTS

| JP | 2013-084130 A | | 5/2013 |
| JP | 2013-088477 A | | 5/2013 |
| JP | 2019215807 A | * | 12/2019 |
| KR | 102456189 B1 | * | 10/2022 |
| WO | 2013/118491 A1 | | 8/2013 |
| WO | 2017/038100 A1 | | 3/2017 |

OTHER PUBLICATIONS

Heredia, Andres, and Gabriel Barros-Gavilanes, "Edge vs. cloud computing: where to do image processing for surveillance?" Artificial Intelligence and Machine Learning in Defense Applications. vol. 11169 SPIE. (Year: 2019).*
Ali-Eldin, Ahmed, Bin Wang, and Prashant Shenoy, "The hidden cost of the edge: a performance comparison of edge and cloud latencies" Proceedings of the International Conference for High Performance Computing, Networking, Storage and Analysis (Year: 2021).*
International Search Report for PCT Application No. PCT/JP2019/039453, mailed on Dec. 24, 2019.

* cited by examiner ns the input image frame to the cloud server, based on the difference value.
VIDEO ANALYSIS METHOD AND SYSTEM, AND INFORMATION PROCESSING DEVICE, TRANSMITS IMAGE FRAME TO CLOUD SERVER BASED ON DIFFERENCE BETWEEN ANALYSIS RESULT ON THE EDGE SIDE AND RESULT PREDICTED ON A CLOUD SERVER This application is a National Stage Entry of PCT/JP2019/039453 filed on Oct. 7, 2019, the contents of all of which are incorporated herein by reference, in their entirety.

TECHNICAL FIELD

The present invention relates to a video analysis method, a video analysis system, and an information processing device.

BACKGROUND ART

A technique for performing an analysis of a video captured by a camera in a cloud server having abundant computational resources has become widespread. However, since a captured video is distributed to a cloud server via a network, the video at a full rate cannot be transmitted due to bandwidth limitation, and video quality needs to be lowered. As a result, accuracy of a video analysis in the cloud server is not improved.

In view of this, attention has been paid to a technique that combines a video analysis in a server disposed on an edge side connected by wire to a camera and a video analysis in a cloud server. However, when the video analysis is performed in a distributed manner by the edge and the cloud, it is difficult to determine which video frame needs to be transmitted to the cloud side according to a situation.

Patent Literature 1 discloses a technique in which a region including a face of a person is extracted, as a cut-out image, by an edge-side monitoring terminal, and a cut-out image having a certain degree of reliability is transmitted to a server.

CITATION LIST

Patent Literature

[Patent Literature 1] International Patent Publication No. WO 2013/118491

SUMMARY OF INVENTION

Technical Problem

However, in a method described in Patent Literature 1, a monitoring terminal on an edge side which is not abundant in computational resources is hard to properly extract a cut-out image. As a result, a cloud server receives a cut-out image with insufficient accuracy, and accuracy of a video analysis on the cloud server side cannot be improved.

The present invention has been made in order to solve the above problem, and an object of the present invention is to provide a video analysis method, a video analysis system, and an information processing device that improve accuracy of a video analysis at a cloud server and an edge.

Solution to Problem

A video analysis method according to a first aspect of the present disclosure includes:

a first image analysis step of analyzing an input image frame on an edge side;

a difference value estimation step of estimating a difference value between an evaluation value of an analysis result of the first image analysis step and an evaluation value of an analysis result being predicted when the input image frame is analyzed by a cloud server; and a filtering step of determining whether to transmit the input image frame to the cloud server, based on the difference value.

A video analysis system according to a second aspect of the present disclosure includes:

a first image analysis means for being arranged on an edge side, and analyzing an input image frame;

a second image analysis means for being arranged on a cloud server via a network, and having higher accuracy than the first image analysis means;

a difference value estimation means for being arranged on the edge side, and estimating a difference value between an evaluation value of an analysis result of the first image analysis means and an evaluation value of an analysis result being predicted when the input image frame is analyzed by the second image analysis means; and a filtering means for being arranged on the edge side, and determining whether to transmit an input image frame to the second image analysis means of the cloud server via the network, based on a difference value estimated by the difference value estimation means.

An information processing device according to a third aspect of the present disclosure includes:

a first image analysis means for analyzing an input image frame on an edge side;

a difference value estimation means for estimating a difference value between an evaluation value of an analysis result of the first image analysis means and an evaluation value of an analysis result being predicted when the input image frame is analyzed by a cloud server; and a filtering means for determining whether to transmit the input image frame to the cloud server, based on the difference value.

Advantageous Effects of Invention

According to the present disclosure, it is possible to provide a video analysis method, a video analysis system, and an information processing device that improve accuracy of a video analysis at a cloud server and an edge.

DESCRIPTION OF EMBODIMENTS

First Example Embodiment

An example embodiment of the present invention will be described below with reference to the drawings.

Figure 1:
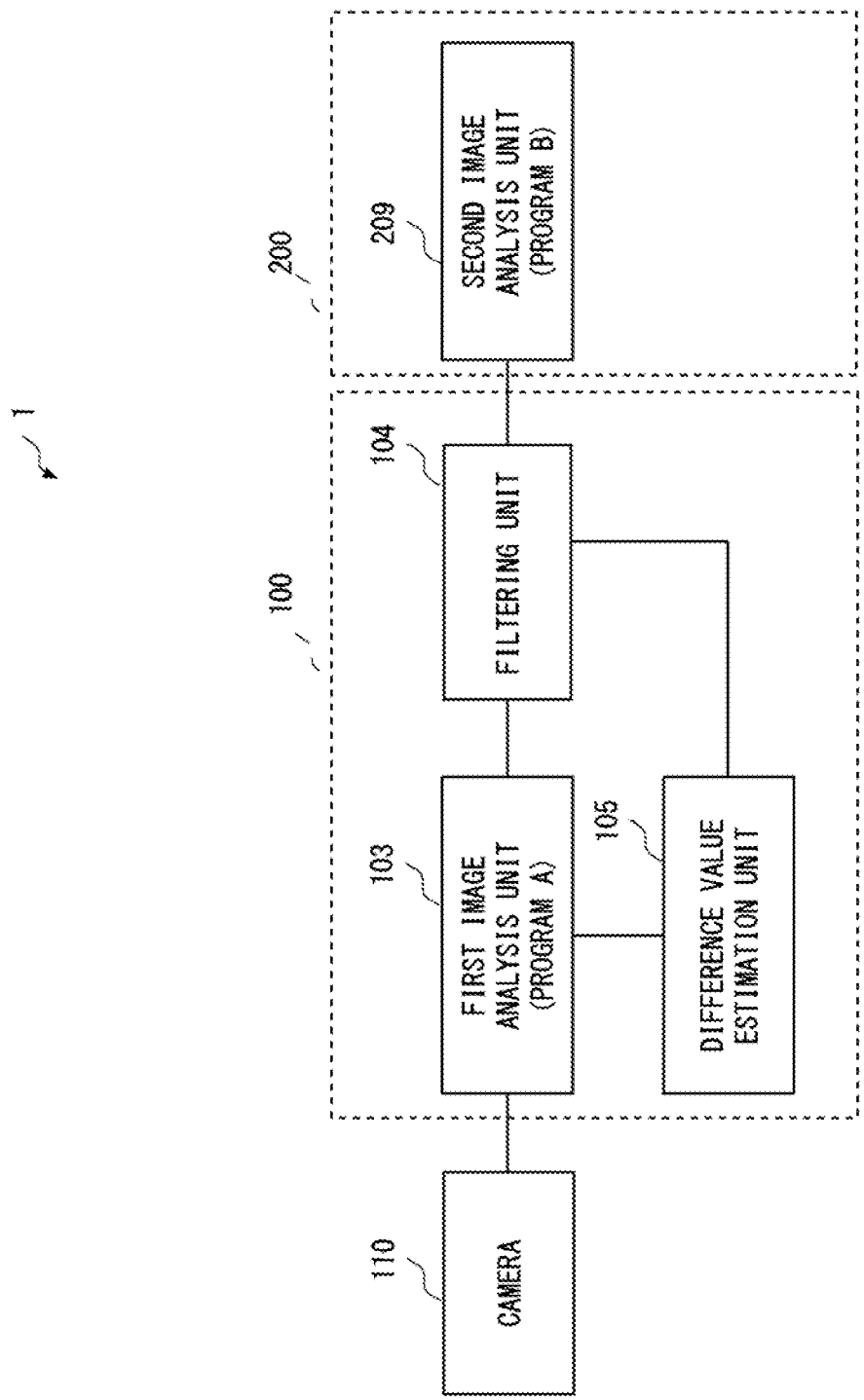
FIG. 1 is a block diagram illustrating a configuration of a video analysis system according to a first example embodiment.

A configuration of a video analysis system will be described with reference to FIG. 1.

In the present video analysis system, a frame whose accuracy becomes better when an analysis is performed using a high-accuracy model is preferentially transmitted to a cloud server, and other frames rely on a result of an edge-side light-weight model. Thus, occurrence of frame dropping or block noise caused by distributing a video frame to the cloud server via a network having bandwidth limitation is suppressed.

A video analysis system 1 includes a camera 110, an information processing device 100 (also referred to as an edge device) being arranged on the edge side, which inputs an image from the camera 110 and analyzes an image, and an information processing device 200 for a video analysis arranged on the cloud server side connected to the information processing device 100 via a network.

The camera 110 inputs a video from an imaging element such as a charge coupled device (CCD) or a complementary metal oxide semiconductor (CMOS), and outputs the input video to a first image analysis unit 103 of the information processing device 100.

The information processing device 100 includes the first image analysis unit 103, a filtering unit 104, and a difference value estimation unit 105.

The first image analysis unit 103 performs an image analysis on a video from the camera 110 using a video analysis program A (also referred to as a light-weight model or a low-accuracy model). Further, the information processing device 200 includes a second image analysis unit 209 including a video analysis program B (also referred to as a high-accuracy model) capable of performing an image analysis with higher accuracy than the video analysis program A. Note that, examples of high-accuracy or light-weight model include a deep neural network model and another statistical model.

The difference value estimation unit 105 on the edge side, which is one of characteristic portions of the present example embodiment, predicts a result of analyzing an input image by the high-accuracy model of the cloud server, and estimates a difference value indicating how much improvement in the analysis accuracy can be expected. In other words, the larger the difference value, the more the image analysis performed by the cloud server can improve the analysis accuracy. Specifically, the difference value estimation unit 105 calculates an evaluation value of the analysis result for an input image, based on an analysis result of the first image analysis unit 103. Further, the difference value estimation unit 105 calculates an evaluation value when an input image is analyzed by the second image analysis unit 209 using a learned model (details will be described later) learned in advance, and thereby estimates a difference value between the evaluation value of the analysis result of the first image analysis unit 103 and the evaluation value when the second image analysis unit 209 analyzes the input image. Note that, the evaluation value referred to herein is a value that analysis accuracy (also referred to as reliability) of the entire input image frame is converted into a numerical value.

The filtering unit 104 determines whether to transmit an input image frame to the second image analysis unit 209 of the cloud server side, based on a difference value estimated by the difference value estimation unit 105.

According to the present example embodiment described above, it is possible to provide a video analysis system in which accuracy of the video analysis at the cloud server and the edge is improved.

Figure 2:
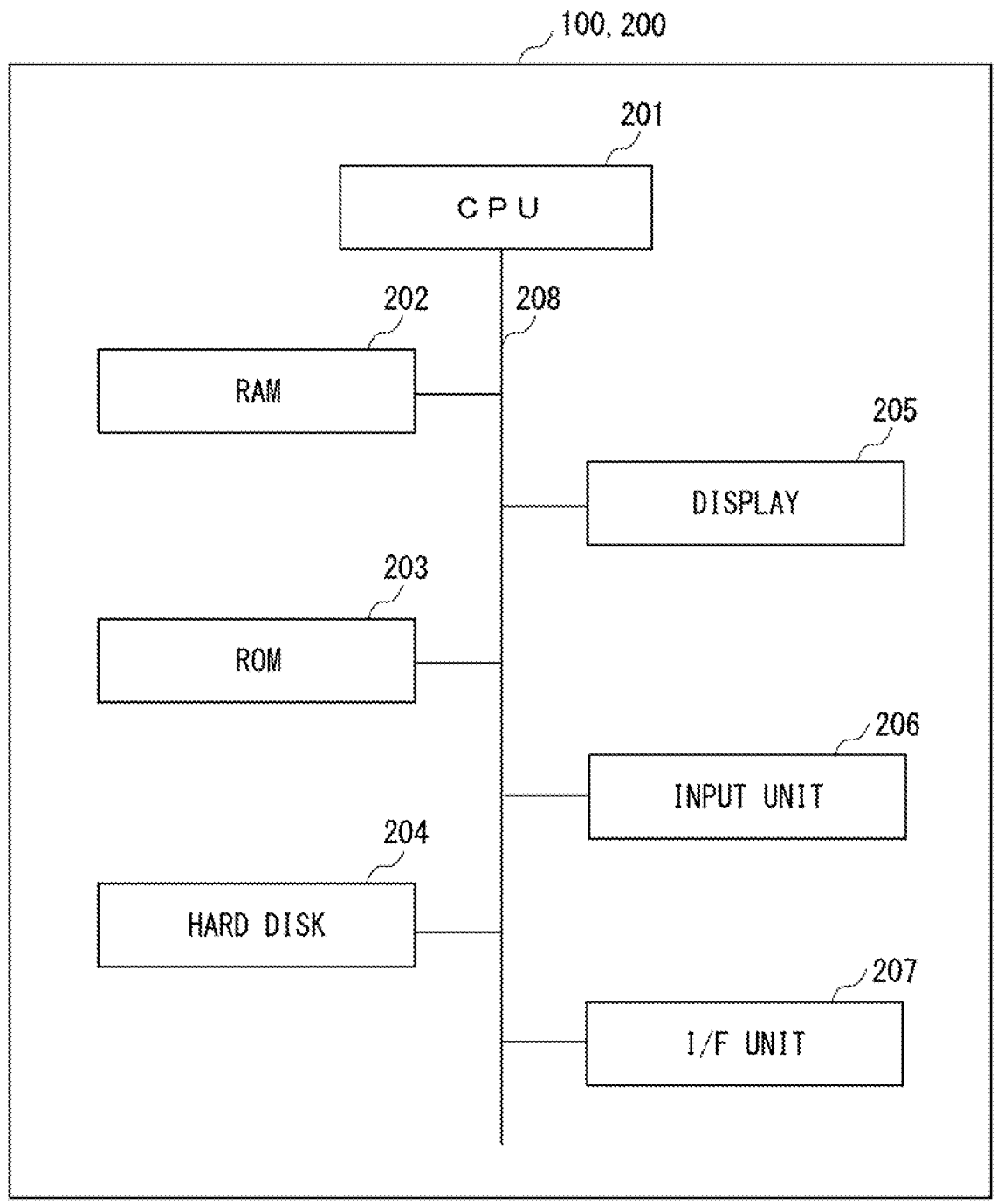
FIG. 2 is a block diagram illustrating an example of a hardware configuration of information processing devices 100 and 200.

FIG. 2 is a block diagram illustrating an example of a hardware configuration of the information processing devices 100 and 200. As illustrated in FIG. 2, the information processing devices 100 and 200 according to the present example embodiment are computers including a central processing unit (CPU) 201, a random access memory (RAM) 202, a read only memory (ROM) 203, and the like. The CPU 201 performs an arithmetic operation and control according to software stored in the RAM 202, the ROM 203, or a hard disk 204. The RAM 202 is used as a temporary storage area when the CPU 201 executes various kinds of pieces of processing. The hard disk 204 stores an operating system (OS), a registration program to be described later, and the like. A display 205 is configured by a liquid crystal display and a graphic controller, and an object such as an image or an icon, a GUI, and the like are displayed on the display 205. An input unit 206 is a device for causing a user to give various kinds of instructions to a terminal device 200, and is configured by, for example, a mouse and a keyboard. An interface (I/F) unit 207 can control wireless LAN communication or wired LAN communication conforming to a standard such as IEEE 802.11a, and communicates with external equipment via the same communication network and the Internet, based on a protocol such as a TCP/IP. A system bus 208 controls data exchange with the CPU 201, the RAM 202, the ROM 203, the hard disk 204, and the like.

Figure 3:
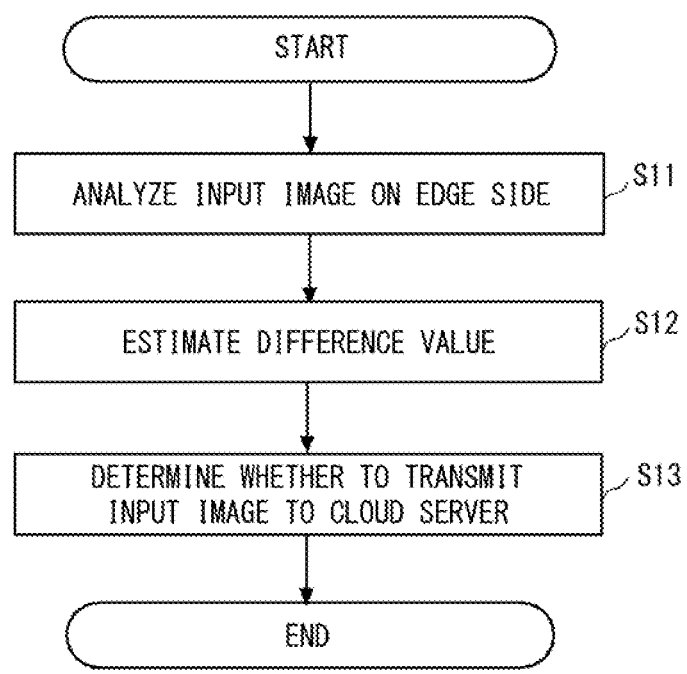
FIG. 3 is a flowchart illustrating a video analysis method according to the first example embodiment.

A video analysis method according to the first example embodiment will be described with reference to FIG. 3.

The video analysis method according to the first example embodiment includes analyzing (step S11) a input image frame on an edge side, a difference value estimation step (step S12) of estimating a difference value between an evaluation value of an analysis result in a first image analysis step and an evaluation value of an analysis result being predicted when the input image frame is analyzed by a cloud server, and a filtering step (step S13) of determining whether to transmit the input image frame to the cloud server, based on the difference value.

According to the present example embodiment, it is possible to provide a video analysis method in which accuracy of a video analysis at a cloud server and an edge is improved.

Second Example Embodiment

Next, a video analysis method and a video analysis system according to a second example embodiment will be described with reference to FIGS. 4 to 12.

The video analysis method according to the present example embodiment includes a learning method executed in advance before operating the present video analysis system, and a video analysis method using the learned model.

Figure 4:
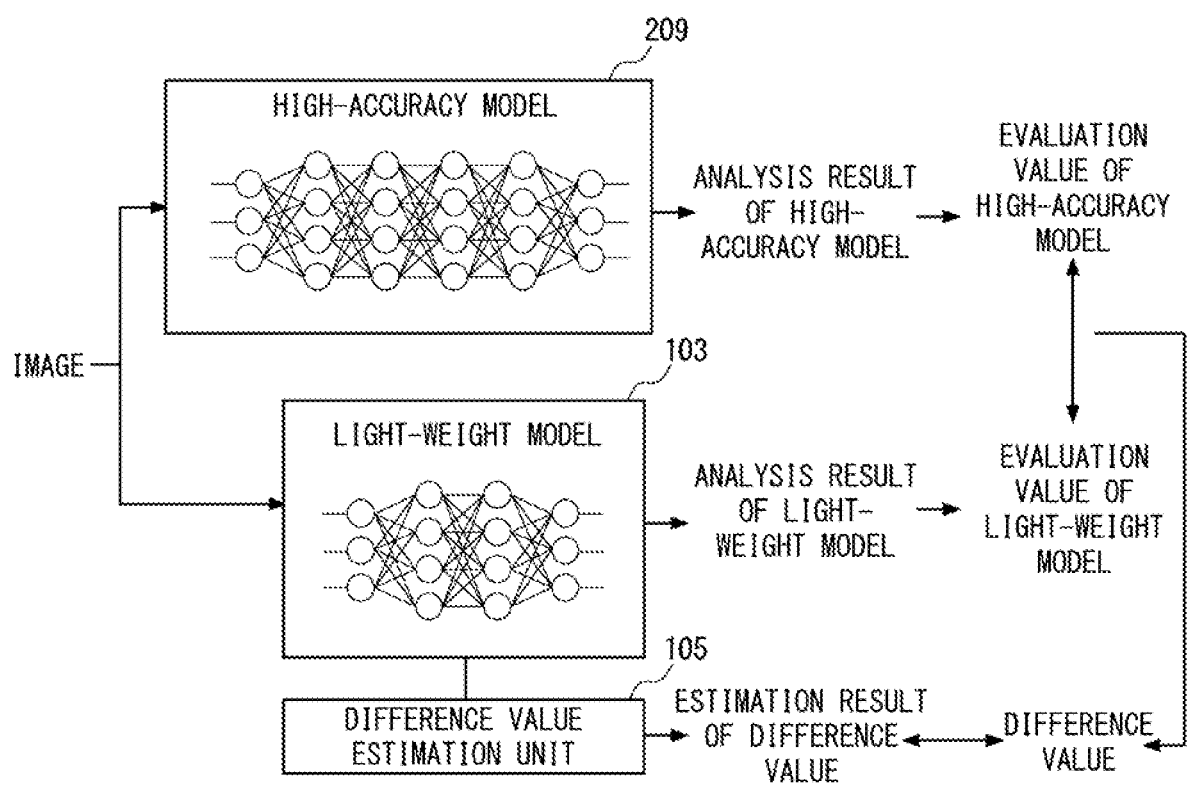
FIG. 4 is a diagram illustrating a learning method of a difference value estimation unit according to a second example embodiment.
Figure 5:
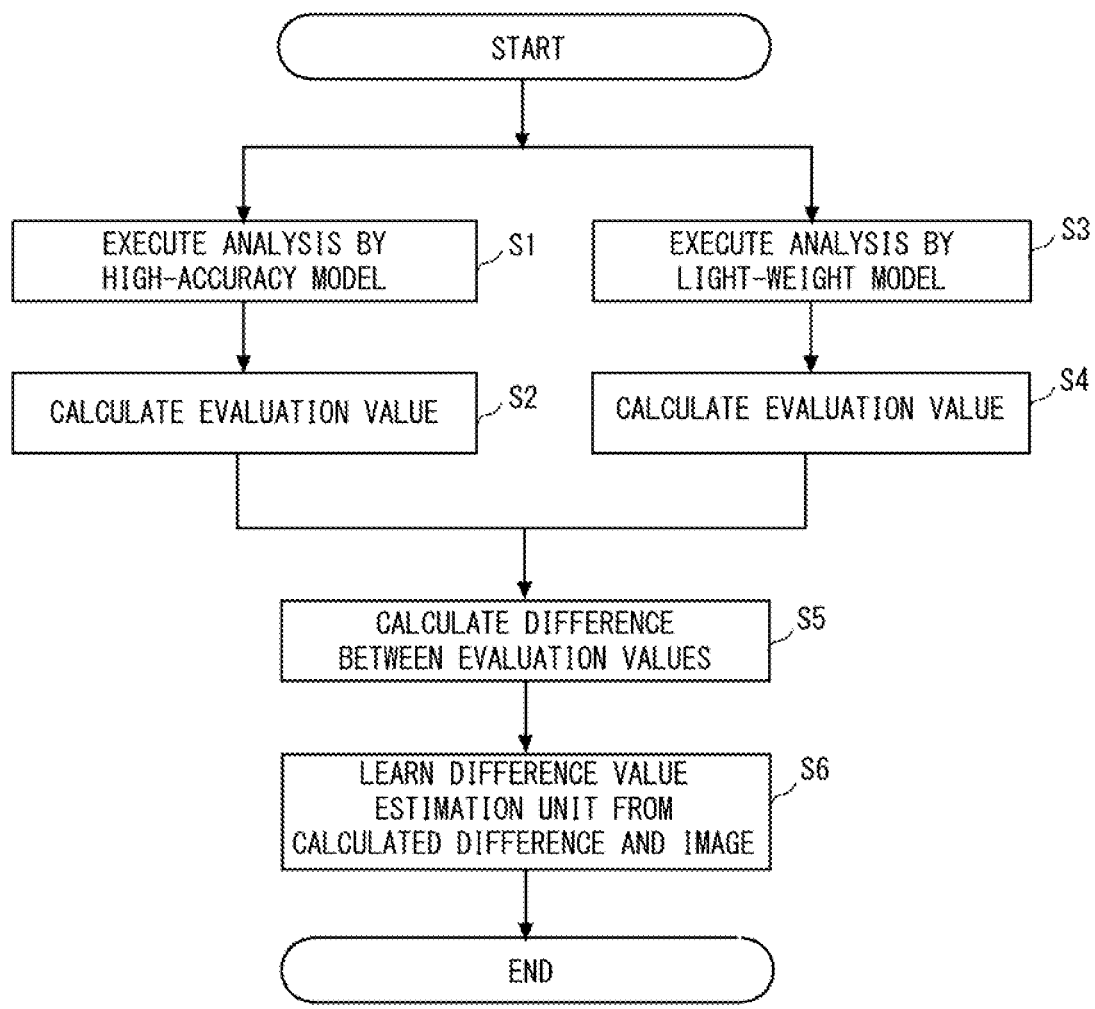
FIG. 5 is a flowchart illustrating a learning method of the difference value estimation unit according to the second example embodiment.

First, a learning method of a difference value estimation unit will be described with reference to FIGS. 4 and 5.

An image captured by a camera or the like is input to a second image analysis unit 209 being capable of executing a high-accuracy model on a cloud server side (step S1). The second image analysis unit 209 analyzes the input image, and calculates an evaluation value from the analysis result (step S2). An image captured by a camera or the like is input to a first image analysis unit 103 being capable of executing a light-weight model (low-accuracy model) on an edge side (step S3). The first image analysis unit 103 analyzes the input image, and calculates an evaluation value (step S4). A difference between the evaluation value of the analysis result of the second image analysis unit 209 and the evaluation value of the analysis result of the first image analysis unit 103, which are calculated in parallel in this manner, is calculated (step S5). A difference value estimation unit 105 learns the calculated difference and the input image (step S6).

Note that, the evaluation value is a value that analysis accuracy (also referred to as reliability) of the entire input image frame is converted into a numerical value. The entire input image frame means an input image frame itself in which a part of the input image frame (e.g., a region including a face of a person) is not cut out.

The difference between the evaluation values may use an absolute difference, or may use a relative difference. For example, when the evaluation value of the analysis result by the first image analysis unit 103 with respect to an input image 1 is 95% and the evaluation value of the analysis result of the second image analysis unit 209 with respect to the input image 1 is 97%, the absolute difference is 0.97−0.95=0.02, and the relative difference is (0.97−0.95)/0.95.

Next, when the evaluation value of the analysis result by the first image analysis unit 103 with respect to an input image 2 is 45% and the evaluation value of the analysis result of the second image analysis unit 209 with respect to the input image 1 is 47%, the absolute difference is 0.47−0.45=0.02 and the relative difference is (0.47−0.45)/0.45.

In other words, although the absolute differences between the input image 1 and the input image 2 are the same, the relative differences therebetween is larger the input image 2 than the input image 1. As a result, it can be determined that the input image 2 having a large relative difference should be preferentially transmitted to the cloud server side.

In addition, although details will be described later, since analysis accuracy of an image in the low-accuracy model and a high-performance model differs for each time period (e.g., day time and night time), and an estimated difference value also differs, it is preferable to learn, in advance, a distribution of the difference value for each time period.

The learned model generated in advance in this manner is stored in a storage unit (a hard disk 204 in FIG. 2) of an information processing device 100, or in an external storage unit connected to the information processing device 100 via a network. Note that, examples of a model used for machine learning of the difference value estimation unit include a deep neural network model and another statistical model.

The learning step described above is performed, in advance, before the video analysis method is performed (before operating as the video analysis system).

Next, the video analysis method using a learned model will be described with reference to FIGS. 6 to 9.

Figure 6:
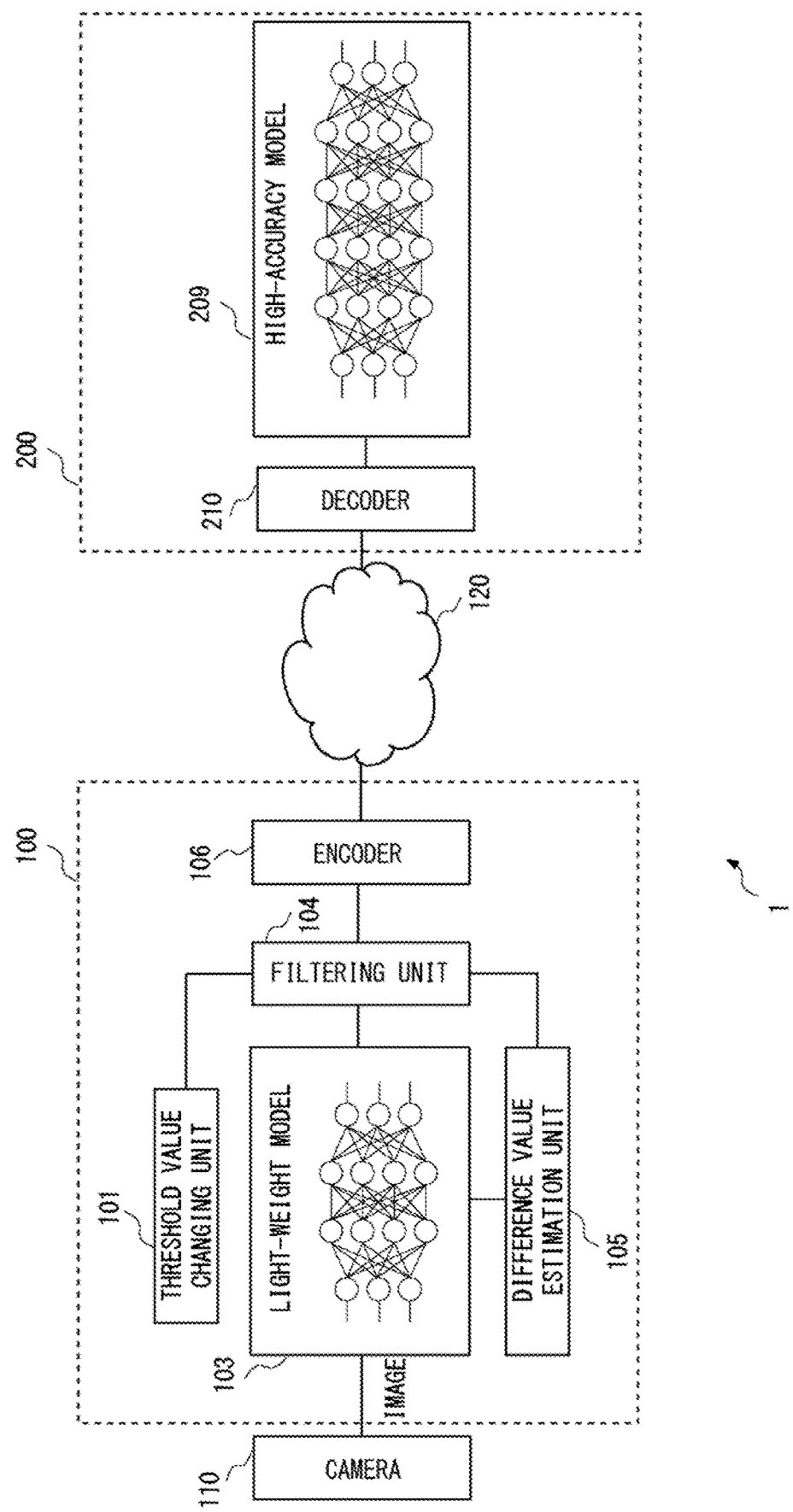
FIG. 6 is a block diagram illustrating a configuration of a video analysis system according to the second example embodiment.
Figure 7:
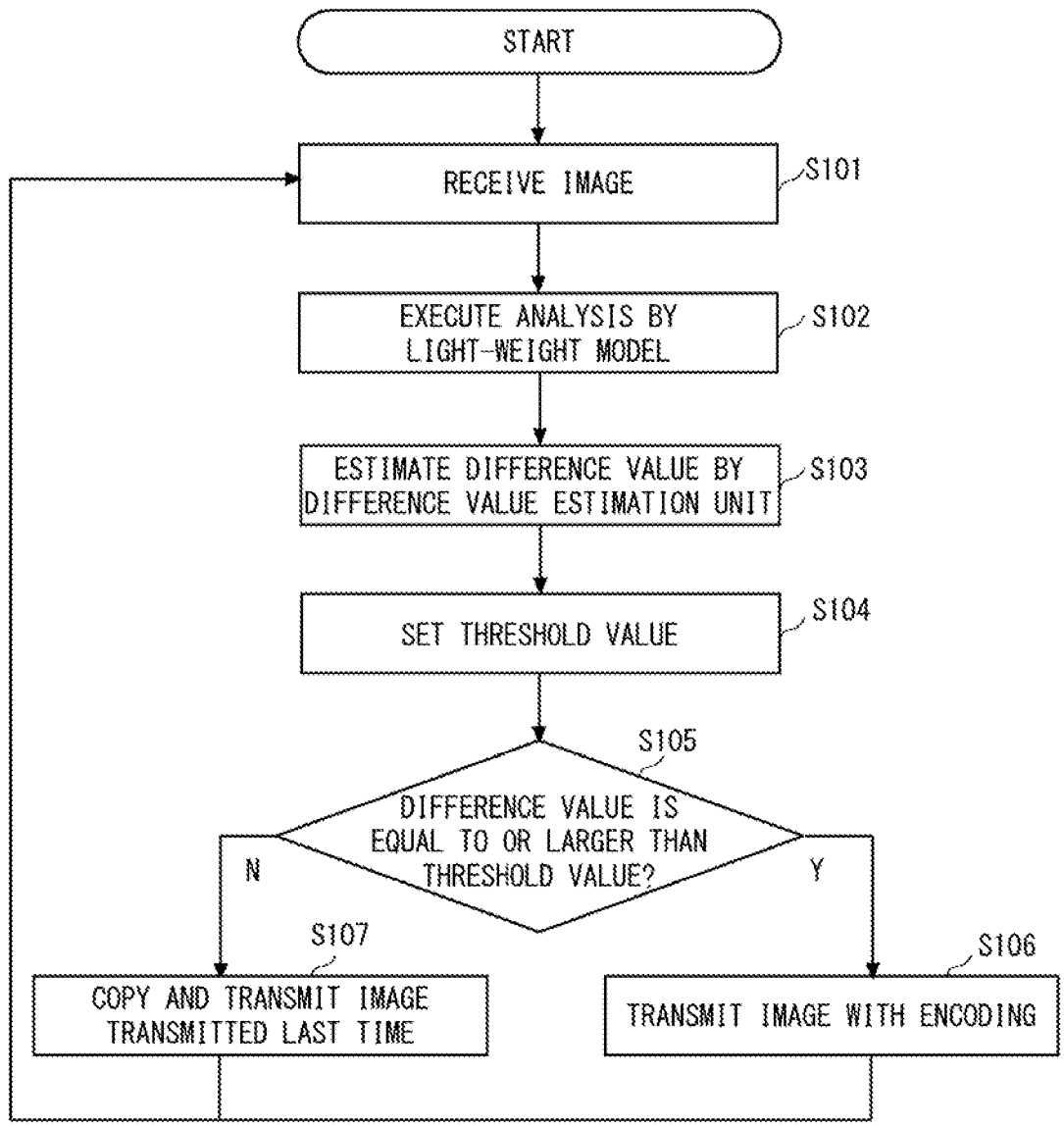
FIG. 7 is a flowchart illustrating an operation of an edge side in the video analysis system according to the second example embodiment.
Figure 8:
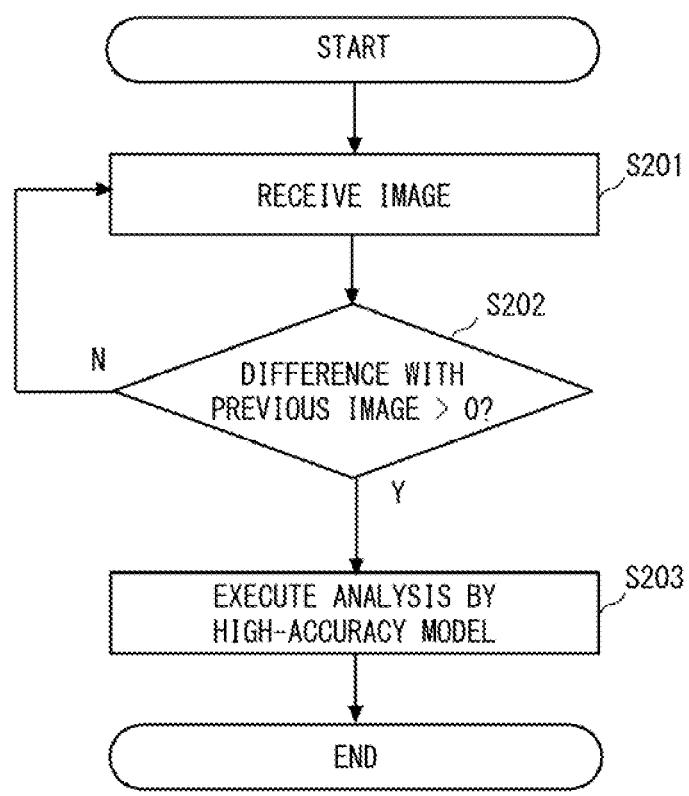
FIG. 8 is a flowchart illustrating an operation of a cloud side in the video analysis system according to the second example embodiment.
Figure 9A:
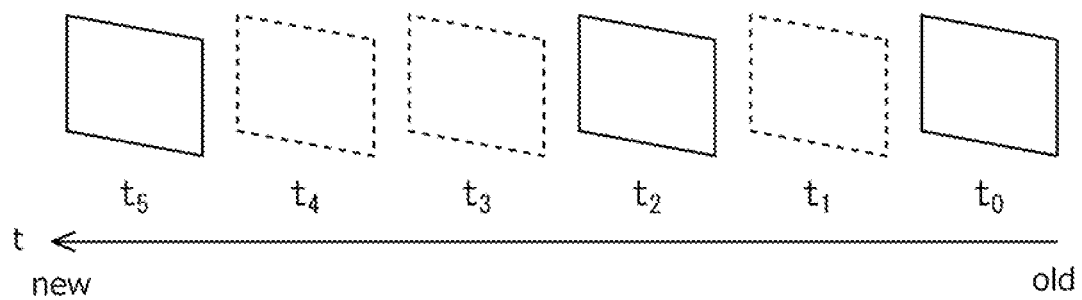
FIG. 9A is a diagram illustrating a series of frames of a video being transmitted along a time series.
Figure 9B:
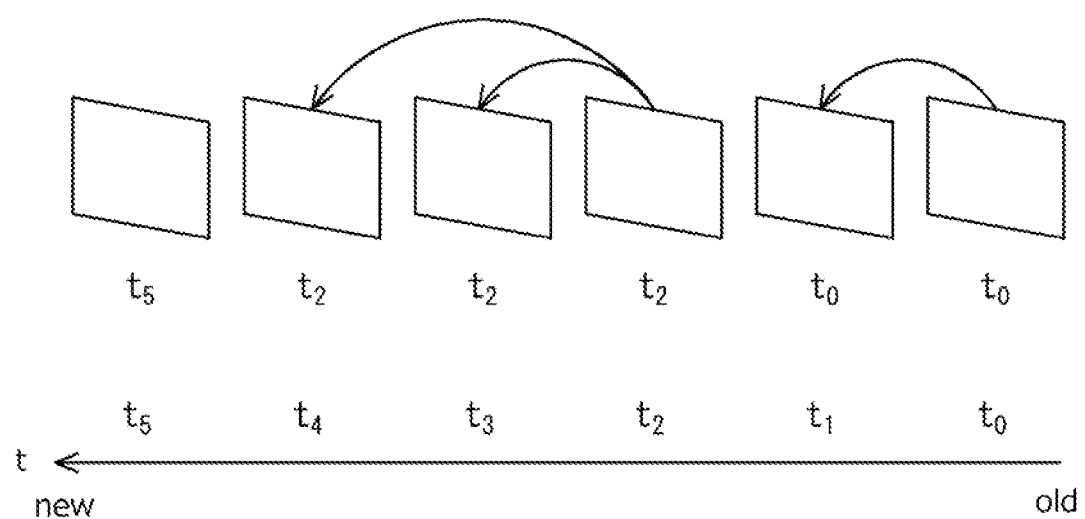
FIG. 9B is a diagram illustrating a series of frames of a video being transmitted along a time series.
Figure 9C:
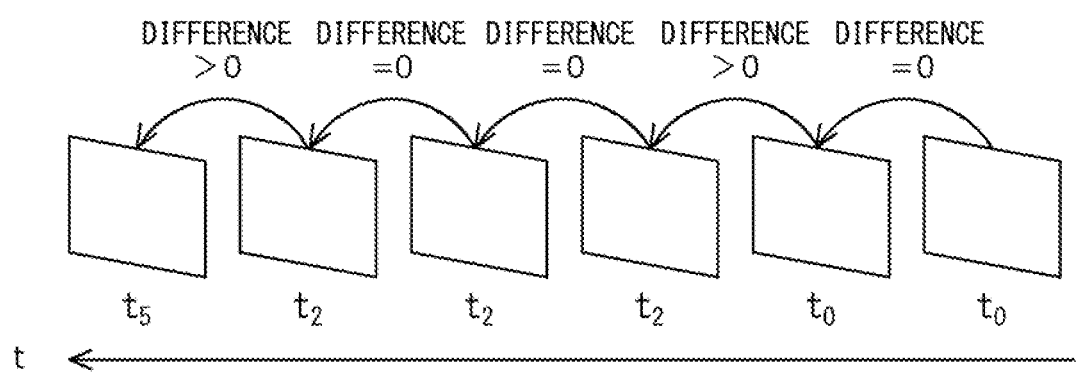
FIG. 9C is a diagram illustrating a series of frames of a video being transmitted along a time series.

FIG. 6 is a block diagram illustrating a configuration of the video analysis system according to the second example embodiment. In FIG. 5, the same components as those of the first example embodiment are denoted by the same reference signs as those of FIG. 1, and description thereof is omitted as appropriate. FIG. 7 is a flowchart illustrating an operation of the information processing device 100 on the edge side in the video analysis system according to the present example embodiment. FIG. 8 is a flowchart illustrating an operation of the information processing device 200 on the cloud side in the video analysis system according to the present example embodiment. FIGS. 9A to 9C are diagrams illustrating a series of frames of a video being transmitted along a time series.

A threshold value changing unit 101 is added to the information processing device 100 on the edge side according to the present example embodiment. The threshold value changing unit 101 dynamically changes a threshold value in response to a predetermined condition (details will be described later). In addition, an encoder 106 connected to a filtering unit 104 is added to the information processing device 100 on the edge side according to the present example embodiment. Further, a decoder 210 is added to the information processing device 200 on the cloud side via the encoder 106 and a network 120. The encoder 106 transmits only a frame to be transmitted with performing encoding by video encoding such as H.264 and H.265. Note that, the encoder 106 may also be referred to as a transmission unit. Although the information processing device 100 illustrated in FIG. 6 has a configuration not including a camera 110, the information processing device 100 may include the camera 110.

Herein, when a frame to be transmitted from the edge side to the cloud server side is not constant, the number of frames on the edge side and the number of frames on the cloud server side are different from each other, so that a time lag occurs between the edge side and the cloud server side. Therefore, in order to make a frame rate constant in such a way that the time on the edge side coincides with the time in the cloud server, the encoder 106 transmits the same frame as a frame transmitted last time for a frame that is not transmitted.

The decoder 210 decodes a received video, and divides the video into frames. Further, the decoder 210 calculates a difference from a previous frame, and when there is no difference, the decoder 210 determines that the frame is a frame copied by the encoder 106, and discards the frame.

The operation of the information processing device 100 on the edge side will be described with reference to the flowchart in FIG. 7.

First, as illustrated in FIG. 6, when an image frame acquired by dividing a video captured by the camera 110 into a plurality of frames is input to the first image analysis unit 103 being equipped with the light-weight model (step S101 in FIG. 7), an image analysis is performed by the light-weight model (step S102). Next, as described above, the difference value estimation unit 105 estimates a difference (relative difference) between an evaluation value of an analysis result by the first image analysis unit 103 with respect to the input image using a learned model and an evaluation value of an analysis result that will be acquired by an analysis by the high-performance model when the input image is transmitted to the cloud server side (step S103). Next, the filtering unit 104 compares with the difference value, and sets a threshold value for determining whether to transmit the input image to the cloud server side (step S104). Details of a setting method of a threshold value will be described later.

The filtering unit 104 compares the estimated difference value with a threshold value (step S105). When the difference value is equal to or larger than the threshold value (Y in step S105), the encoder 106 encodes the image, and transmits the encoded image to the second image analysis unit 209 of the cloud server side (step S106).

On the other hand, when the estimated difference value is less than the threshold value (N in step S105), the encoder 106 copies an image transmitted last time, and transmits the copied image to the second image analysis unit 209 of the cloud server side (step S106). Herein, referring to FIG. 9, a series of frames of a video being transmitted along a time series will be described. As illustrated in FIG. 9A, among a series of frames of a video being transmitted along a time series, at times $t_1$, $t_3$, and $t_4$, since it is determined that the difference values of the frames are less than the threshold value, the frames are not transmitted to the cloud server (in FIG. 9A, the frames that are not transmitted are indicated by broken lines). For this reason, a frame rate dynamically fluctuates (frames are skipped), and there is a case where encoding and decoding may not be able to execute. Therefore, as illustrated in FIG. 9B, for a frame determined not to be transmitted, a frame transmitted last time is copied, performed encoding, and transmitted. In other words, in the $t_1$, a frame at a $t_0$ is copied and transmitted, and in the $t_3$ and $t_4$, a frame at a $t_2$ is copied, performed encoding, and transmitted. Thus, as illustrated in FIG. 9C, difference information between the frame transmitted last time and the copied frame becomes 0. As a result, an amount of traffic after encoding becomes almost 0 (constant).

Next, the operation of the information processing device 200 on the cloud side will be described with reference to the flowchart in FIG. 8.

The decoder 210 of the information processing device 200 receives an image performed encoding by the encoder 106 of the information processing device 100 (step S201). The decoder 210 decodes the received video, and divides the video into a plurality of time-series frames. As illustrated in FIG. 9C, when it is determined that a difference between an image frame and a previous image frame is larger than 0 (Y in step S202), the frame is transmitted to the second image analysis unit 209 of the cloud server side. Note that, although a frame difference is assumed to be a mean squared error (MSE), a hash may be used. The second image analysis unit 209 performs an image analysis on the received image using the high-accuracy model (step S203).

On the other hand, as illustrated in FIG. 9C, when it is determined that a difference between an image frame and a previous image frame is 0 (i.e., the frame is one in which a copy of the frame transmitted last time has been transmitted) (N in step S202), the decoder 210 discards the frame (i.e., the frame is not analyzed by the second image analysis unit 209). As described above, even when a frame is skipped, by inserting a copy of a frame transmitted last time on the edge side, transmitting the copy to the cloud server, and calculating a difference between the frames on the cloud server side, which frame is copied can be recognized, and it can be determined whether analysis is necessary for each frame.

Figure 10:
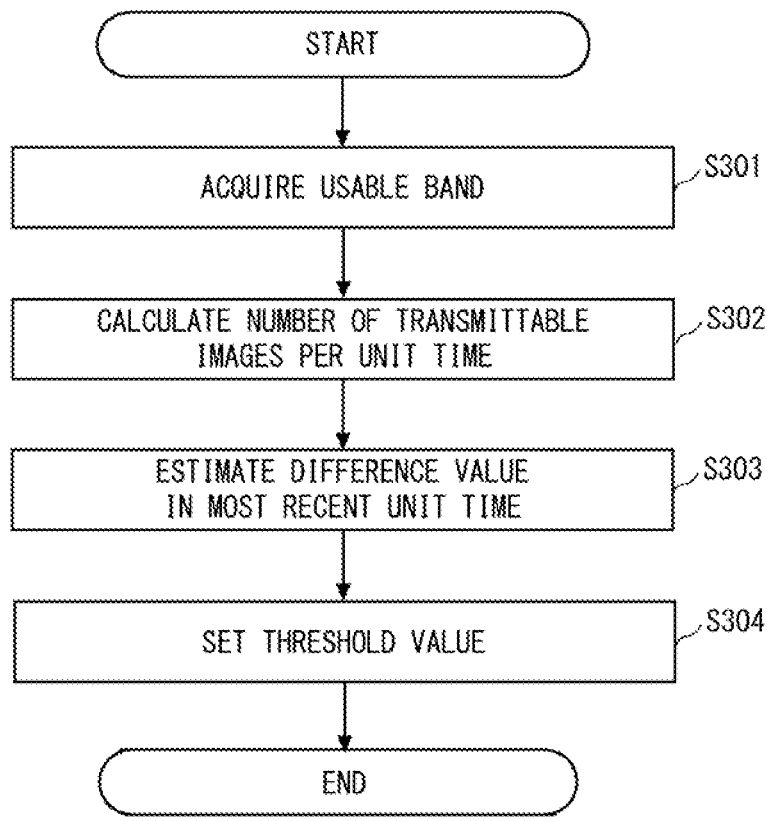
FIG. 10 is a flowchart illustrating a method of dynamic setting of a threshold value according to the second example embodiment.

Next, with reference to FIG. 10, a method of dynamic setting of a threshold value by the threshold value changing unit 101 will be described. In the method of setting of a threshold value, a plurality of frames are subjected to micro-batch processing, and a threshold value is dynamically set in such a way that a frame having a large difference value is preferentially transmitted according to a band (hereinafter, also referred to as a usable band) that can be used in order to transmit the frame from the edge side to the cloud side. As a result, it is possible to suppress a problem that block noise or frame dropping occurs due to a fluctuation in a usable band.

Specifically, the threshold value changing unit 101 periodically acquires a usable band (step S301). Since the usable band may constantly fluctuate, for example, the usable band may be acquired every one second. Next, the number of transmittable images per predetermined time (e.g., unit time) in the acquired usable band is calculated (step S302). For example, the number of transmittable images per unit time is calculated to be 3. Next, a difference value in the most recent predetermined time (e.g., unit time) is estimated (step S303). For example, a difference value for each frame per most recent unit time is estimated to be [2.2, 1.1, 5.3, 3.0, 1.9, 2.6, 4.2, 3.5]. Since the number of images that can be transmitted is 3, 3.5 being the third highest among a distribution of the estimated series of difference values is set as a threshold value (step S304). As a result, by not transmitting to the cloud server an image whose accuracy cannot be expected to be improved by an image analysis on the cloud server side, it is possible to suppress occurrence of unnecessary block noise and frame dropping even when a network having band limitation is used.

Figure 11:
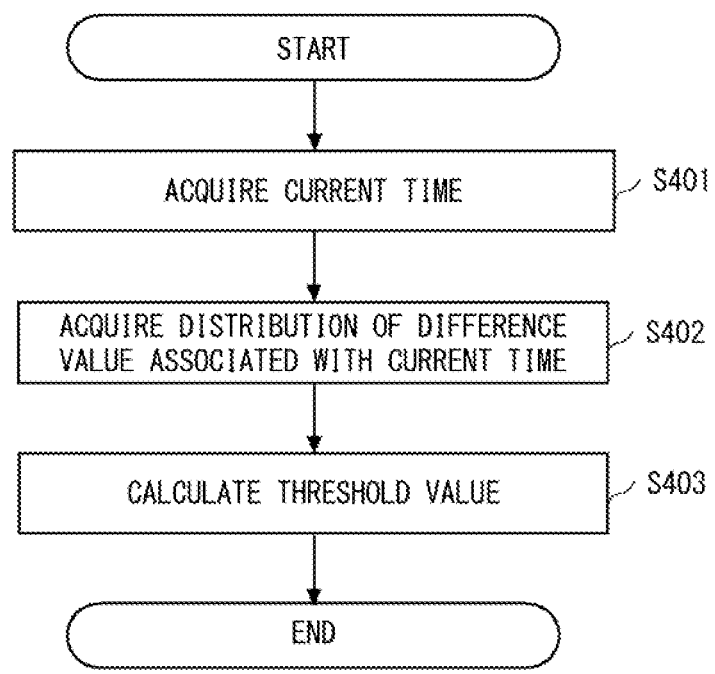
FIG. 11 is a flowchart illustrating another method of dynamic setting of a threshold value according to the second example embodiment.
Figure 12:
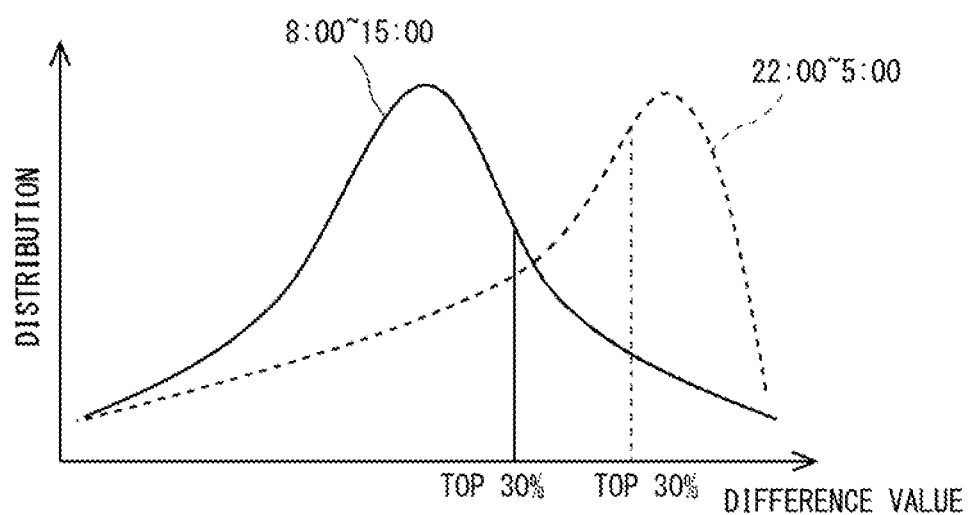
FIG. 12 is a graph illustrating a distribution of difference values being different for each time period.

Next, another method of setting of a threshold value by the threshold value changing unit 101 will be described with reference to FIGS. 11 and 12. In the method of setting of a threshold value, since accuracy of an image analysis differs in response to the current time (i.e., a distribution of the difference values for each time period differs), a threshold value in response to the current time is dynamically set. In other words, for example, at night time, since it is difficult to recognize an object and analysis accuracy of an image is deteriorated, it is necessary to use a distribution of difference values associated with the night time.

The threshold value changing unit 101 acquires the current time (e.g., 11:00 p.m.) (step S401). Next, a distribution of the difference values associated with the current time is acquired (step S402). A distribution curve of the difference value associated with the current time of 11:00 p.m. (a distribution curve from 11:00 p.m. to 5:00 a.m. illustrated by a broken line in FIG. 12) is acquired. For example, as illustrated in FIG. 12, a difference value associated with a top 30% of the distribution is calculated, and set as a threshold value (step S403). Note that, herein, the top 30% is set as a reference value, but the present invention is not limited thereto. The reference value can be set to any value being expected to improve accuracy by transmitting an image to the cloud server.

As described above, the threshold value changing unit of the edge side according to the present example embodiment can dynamically change a threshold value, and can determine which video frame should be transmitted to the cloud server according to a situation. Further, according to the video analysis method and the video analysis system according to the present example embodiment, even when a network having band limitation is used, it is possible to perform a video analysis with high accuracy by distributing between the edge and the cloud server.

Note that, the flowcharts in FIGS. 3, 7, 8, 10, and 11 described above illustrate specific order of execution, but the order of execution may be different from the illustrated form. For example, the order of execution of two or more steps may be interchanged with respect to the illustrated order. Also, two or more steps illustrated in succession in FIGS. 3, 7, 8, 10, and 11 may be executed simultaneously or partially simultaneously. Further, in some example embodiments, one or a plurality of steps illustrated in FIGS. 3, 7, 8, 10, and 11 may be skipped or omitted.

In the above examples, a program can be stored using various types of non-transitory computer readable media, and supplied to a computer. The non-transitory computer readable medium includes various types of tangible storage media. Examples of the non-transitory computer readable medium include a magnetic recording medium, a magneto-optical recording medium (e.g., a magneto-optical disk), a CD-read only memory (ROM), a CD-R, a CD-R/W, and a semiconductor memory. The magnetic recording medium may be, for example, a flexible disk, a magnetic tape, or a hard disk drive. The semiconductor memory may be, for example, a mask ROM, a programmable ROM (PROM), an erasable PROM (EPROM), a flash ROM, or a random access memory (RAM). Further, the program may also be supplied to the computer by various types of transitory computer readable media. Examples of the transitory computer readable medium include an electrical signal, an optical signal, and an electromagnetic wave. The transitory computer readable medium can supply the program to the computer via a wired communication path such as an electric wire and an optical fiber, or a wireless communication path.

Note that, it should be noted that the present invention is not limited to the above-mentioned example embodiments, and can be appropriately modified within a range not deviating from the gist.

Some or all of the above example embodiments may also be described as the following supplementary note, but are not limited to the following.

Supplementary Note 1

A video analysis method including:
a first image analysis step of analyzing an input image frame on an edge side;
a difference value estimation step of estimating a difference value between an evaluation value of an analysis result of the first image analysis step and an evaluation value of an analysis result being predicted when the input image frame is analyzed by a cloud server; and
a filtering step of determining whether to transmit the input image frame to the cloud server, based on the difference value.

Supplementary Note 2

The video analysis method according to supplementary note 1, further including a threshold value changing step of dynamically changing a threshold value of a difference value for performing the determination.

Supplementary Note 3

The video analysis method according to supplementary note 2, further including, in the threshold value changing step, acquiring a current time, and changing the threshold value according to a distribution of difference values at the current time.

Supplementary Note 4

The video analysis method according to supplementary note 2, further including, in the threshold value changing step, acquiring a usable band, and changing the threshold value according to the number of transmittable images per predetermined time in the acquired usable band and a series of estimated difference values in a most recent predetermined time.

Supplementary Note 5

The video analysis method according to any one of supplementary notes 1 to 4, further including, in the filtering step, determining whether to transmit the entire input image frame to the cloud server.

Supplementary Note 6

The video analysis method according to any one of supplementary notes 1 to 5, further including a step of transmitting, to the cloud server, an entire input image frame determined, in the filtering step, to be transmitted to the cloud server, and, for an input image frame not determined to be transmitted to the cloud server, copying a frame transmitted last time and transmitting the copied frame to the cloud server.

Supplementary Note 7

A video analysis system, including:
a first image analysis means for being arranged on an edge side, and analyzing an input image frame;
a second image analysis means for being arranged on a cloud server via a network, and having higher accuracy than the first image analysis means;
a difference value estimation means for being arranged on the edge side, and estimating a difference value between an evaluation value of an analysis result of the first image analysis means and an evaluation value of an analysis result being predicted when the input image frame is analyzed by the second image analysis means; and
a filtering means for being arranged on the edge side, and determining whether to transmit an input image frame to the second image analysis means of the cloud server via the network, based on a difference value estimated by the difference value estimation means.

Supplementary Note 8

The video analysis system according to supplementary note 7, further including a threshold value changing means for dynamically changing a threshold value of a difference value for performing the determination in response to a predetermined condition.

Supplementary Note 9

The video analysis system according to supplementary note 8, wherein the threshold value changing means acquires a current time, and changes the threshold value according to a distribution of difference values at the acquired current time.

Supplementary Note 10

The video analysis system according to supplementary note 8, wherein the threshold value changing means acquires a usage band, and changes the threshold value according to the number of transmittable images per predetermined time in the acquired usage band and a series of estimated difference values in a most recent predetermined time.

Supplementary Note 11

The video analysis system according to any one of supplementary notes 7 to 10, wherein the filtering means determines whether to transmit the entire input image frame to the second image analysis means via the network.

Supplementary Note 12

The video analysis system according to any one of supplementary notes 7 to 11, further including a transmission means for transmitting, to the second image analysis means, an entire input image frame determined, by the filtering means, to be transmitted to the second image analysis means, and, for an input image frame not determined, by the filtering means, to be transmitted to the second image analysis means, copying a frame transmitted last time and transmitting the copied frame to the second image analysis means.

Supplementary Note 13

An information processing device including:
a first image analysis means for analyzing an input image frame on an edge side;
a difference value estimation means for estimating a difference value between an evaluation value of an analysis result of the first image analysis means and an evaluation value of an analysis result being predicted when the input image frame is analyzed by a cloud server; and
a filtering means for determining whether to transmit the input image frame to the cloud server, based on the difference value.

Supplementary Note 14

The information processing device according to supplementary note 13, further including a threshold value changing means for dynamically changing a threshold value of a difference value for performing the determination.

Supplementary Note 15

The information processing device according to supplementary note 14, wherein the threshold value changing means acquires a current time, and changes the threshold value according to a distribution of difference values at the current time.

Supplementary Note 16

The information processing device according to supplementary note 14, wherein the threshold value changing means acquires a usable band, and changes the threshold value according to the number of transmittable images per predetermined time in the acquired usable band and a series of estimated difference values in a most recent predetermined time.

Supplementary Note 17

The information processing device according to any one of supplementary notes 13 to 16, wherein the filtering means determines whether to transmit the entire input image frame to the cloud server via a network.

Supplementary Note 18

The information processing device according to any one of supplementary notes 13 to 17, further including a transmission means for transmitting, to the cloud server, an entire input image frame determined, by the filtering means, to be transmitted to the cloud server, and, for an input image frame not determined, by the filtering means, to be transmitted to the cloud server, copying a frame transmitted last time and transmitting the copied frame to the cloud server.

1 Video analysis system
100 Information processing device
101 Threshold value changing unit
103 First image analysis unit
104 Filtering unit
105 Difference value estimation unit
106 Encoder
110 Camera
120 Network
200 Information processing device
209 Second image analysis unit
210 Decoder

What is claimed is:
1. A video analysis method comprising:
a first image analysis step of analyzing an input image frame on an edge side;
a difference value estimation step of estimating a difference value between an evaluation value of an analysis result of the first image analysis step and an evaluation value of an analysis result being predicted when the input image frame is analyzed by a cloud server; and
a filtering step of determining whether to transmit the input image frame to the cloud server, based on the difference value.
2. The video analysis method according to claim 1, further comprising a threshold value changing step of dynamically changing a threshold value of a difference value for performing the determination.
3. The video analysis method according to claim 2, further comprising, in the threshold value changing step, acquiring a current time, and changing the threshold value according to a distribution of difference values at the current time.
4. The video analysis method according to claim 2, further comprising, in the threshold value changing step, acquiring a usable band, and changing the threshold value according to the number of transmittable images per predetermined time in the acquired usable band and a series of estimated difference values in a most recent predetermined time.
5. The video analysis method according to claim 1, further comprising, in the filtering step, determining whether to transmit the entire input image frame to the cloud server.
6. The video analysis method according to claim 1, further comprising a step of transmitting, to the cloud server, an entire input image frame determined, in the filtering step, to be transmitted to the cloud server, and, for an input image frame not determined to be transmitted to the cloud server, copying a frame transmitted last time and transmitting the copied frame to the cloud server.

7. A video analysis system, comprising:
   first image analysis unit arranged on an edge side, and analyzing configured to analyze an input image frame;
   second image analysis unit arranged on a cloud server via a network, and configured to have higher accuracy than the first image analysis unit;
   difference value estimation unit arranged on the edge side, and configured to estimate a difference value between an evaluation value of an analysis result of the first image analysis unit and an evaluation value of an analysis result being predicted when the input image frame is analyzed by the second image analysis unit; and
   filtering unit arranged on the edge side, and configured to determine whether to transmit an input image frame to the second image analysis unit of the cloud server via the network, based on a difference value estimated by the difference value estimation unit.

8. The video analysis system according to claim 7, further comprising threshold value changing unit configured to dynamically change a threshold value of a difference value for performing the determination in response to a predetermined condition.

9. The video analysis system according to claim 8, wherein the threshold value changing unit acquires a current time, and changes the threshold value according to a distribution of difference values at the acquired current time.

10. The video analysis system according to claim 8, wherein the threshold value changing unit acquires a usage band, and changes the threshold value according to the number of transmittable images per predetermined time in the acquired usage band and a series of estimated difference values in a most recent predetermined time.

11. The video analysis system according to claim 7, wherein the filtering unit determines whether to transmit the entire input image frame to the second image analysis unit via the network.

12. The video analysis system according to claim 7, further comprising transmission unit configured to transmit, to the second image analysis unit, an entire input image frame determined, by the filtering unit, to be transmitted to the second image analysis unit, and, for an input image frame not determined, by the filtering unit, to be transmitted to the second image analysis unit, to copy a frame transmitted last time and transmit the copied frame to the second image analysis unit.

13. An information processing device comprising:
   first image analysis unit configured to analyze an input image frame on an edge side;
   difference value estimation unit configured to estimate a difference value between an evaluation value of an analysis result of the first image analysis unit and an evaluation value of an analysis result being predicted when the input image frame is analyzed by a cloud server; and
   filtering unit configured to determine whether to transmit the input image frame to the cloud server, based on the difference value.

14. The information processing device according to claim 13, further comprising threshold value changing unit configured to dynamically change a threshold value of a difference value for performing the determination.

15. The information processing device according to claim 14, wherein the threshold value changing unit acquires a current time, and changes the threshold value according to a distribution of difference values at the current time.

16. The information processing device according to claim 14, wherein the threshold value changing unit acquires a usable band, and changes the threshold value according to the number of transmittable images per predetermined time in the acquired usable band and a series of estimated difference values in a most recent predetermined time.

17. The information processing device according to claim 13, wherein the filtering unit determines whether to transmit the entire input image frame to the cloud server via a network.

18. The information processing device according to claim 13, further comprising transmission unit configured to transmit, to the cloud server, an entire input image frame determined, by the filtering unit, to be transmitted to the cloud server, and, for an input image frame not determined, by the filtering unit, to be transmitted to the cloud server, to copy a frame transmitted last time and transmit, the copied frame to the cloud server.

* * * * *